US009800615B2

(12) United States Patent
Iyer et al.

(10) Patent No.: US 9,800,615 B2
(45) Date of Patent: Oct. 24, 2017

(54) REAL-TIME SECURITY MONITORING USING CROSS-CHANNEL EVENT PROCESSOR

(71) Applicant: Bank of America Corporation, Charlotte, NC (US)

(72) Inventors: Shankar Iyer, East Windsor, NJ (US); Edison M. Castro, Lawrenceville, NJ (US); Sundar Krishnamoorthy, Hightstown, NJ (US)

(73) Assignee: Bank of America Corporation, Charlotte, NC (US)

( * ) Notice: Subject to any disclaimer, the term of this patent is extended or adjusted under 35 U.S.C. 154(b) by 1 day.

(21) Appl. No.: 14/481,223

(22) Filed: Sep. 9, 2014

(65) Prior Publication Data
US 2016/0072840 A1   Mar. 10, 2016

(51) Int. Cl.
*H04L 29/06*   (2006.01)
(52) U.S. Cl.
CPC .......... *H04L 63/20* (2013.01); *H04L 63/1408* (2013.01)
(58) Field of Classification Search
CPC ..... H04L 63/20; H04L 63/1408; H04L 43/00; H04L 63/302; H04L 63/1416; H04L 63/1425; G06F 21/554
USPC .................................................. 726/1, 22–25
See application file for complete search history.

(56) References Cited

U.S. PATENT DOCUMENTS

| 5,881,225 | A  | 3/1999  | Worth            |
|-----------|----|---------|------------------|
| 6,055,510 | A  | 4/2000  | Henrick et al.   |
| 6,108,786 | A  | 8/2000  | Knowlson         |
| 6,330,554 | B1 | 12/2001 | Altschuler et al.|
| 6,377,936 | B1 | 4/2002  | Henrick et al.   |
| 6,438,696 | B1 | 8/2002  | Baran et al.     |
| 6,453,347 | B1 | 9/2002  | Revashetti et al.|
| 6,507,914 | B1 | 1/2003  | Cain et al.      |
| 6,578,010 | B1 | 6/2003  | Teacherson       |
| 6,691,093 | B2 | 2/2004  | Shell            |
| 6,763,378 | B1 | 7/2004  | Hamilton, II et al.|
| 6,895,387 | B1 | 5/2005  | Roberts et al.   |

(Continued)

OTHER PUBLICATIONS

Feb. 28, 2017—(US) Non-Final Office Action—U.S. Appl. No. 14/481,299.

*Primary Examiner* — Edward Zee
*Assistant Examiner* — Chi Nguy
(74) *Attorney, Agent, or Firm* — Banner & Witcoff, Ltd.; Michael A. Springs (57) ABSTRACT

Aspects described herein provide systems and methods for computer system security monitoring. Multiple event monitoring agents may be deployed across an enterprise-wide computing system such that each event monitoring agent monitors at least one event generator of the enterprise-wide computing system. The event monitoring agents may be connected to an event processing server. The event processing server may receive event information generated by the event monitoring agents that describe events occurring at the event generators. The event processing server may perform a security analysis on at least a portion of the event information received that includes applying a security policy to the event information. The event processing server may execute a security response based on the security analysis performed such as, for example, a response specified in the security policy applied.

14 Claims, 6 Drawing Sheets

(56) References Cited

U.S. PATENT DOCUMENTS

| | | |
|---|---|---|
| 7,379,999 B1 | 5/2008 | Zhou et al. |
| 7,430,517 B1 | 9/2008 | Barton |
| 7,904,456 B2 | 3/2011 | Hennan et al. |
| 8,001,594 B2 | 8/2011 | Heintz et al. |
| 8,225,409 B2 | 7/2012 | Newman et al. |
| 8,683,588 B2 | 3/2014 | Esteban et al. |
| 8,726,380 B2 | 5/2014 | de los Reyes et al. |
| 8,732,837 B1 | 5/2014 | Miller et al. |
| 2001/0011236 A1 | 8/2001 | Shell |
| 2006/0010492 A9 | 1/2006 | Heintz et al. |
| 2006/0218639 A1 | 9/2006 | Newman et al. |
| 2008/0060071 A1 | 3/2008 | Hennan |
| 2008/0288345 A1 | 11/2008 | Hirsch |
| 2009/0307028 A1* | 12/2009 | Eldon .................... G06Q 20/12 705/37 |
| 2010/0217616 A1 | 8/2010 | Colson et al. |
| 2010/0280950 A1* | 11/2010 | Faith ................ G06Q 10/06375 705/44 |
| 2011/0060647 A1 | 3/2011 | Weaver et al. |
| 2011/0060648 A1 | 3/2011 | Weaver et al. |
| 2011/0167491 A1 | 7/2011 | Ruggerio |
| 2011/0258049 A1 | 10/2011 | Ramer et al. |
| 2012/0134534 A1 | 5/2012 | Lee et al. |
| 2013/0007879 A1 | 1/2013 | Esteban |
| 2013/0055343 A1 | 2/2013 | de los Reyes et al. |
| 2013/0346117 A1 | 12/2013 | Fields et al. |
| 2014/0157297 A1 | 6/2014 | Chao et al. |
| 2014/0165140 A1* | 6/2014 | Singla ................. G06F 11/3006 726/1 |
| 2014/0366132 A1* | 12/2014 | Stiansen ............. H04L 63/1491 726/22 |
| 2015/0350174 A1* | 12/2015 | Reno ...................... H04L 67/10 726/3 |

\* cited by examiner

REAL-TIME SECURITY MONITORING USING CROSS-CHANNEL EVENT PROCESSOR

CROSS-REFERENCE TO RELATED APPLICATION

This application is related to commonly-owned U.S. patent application Ser. No. 14/481,299 entitled "Targeted Marketing Using Cross-Channel Event Processor" and concurrently filed on Sep. 9, 2014 which is incorporated by reference herein in its entirety.

BACKGROUND

Enterprise-wide computing systems often comprise multiple systems, sub-systems, and computing devices. Such components, however, might operate independently of one another without knowledge or consideration of event occurring at other components. Therefore a need exists for techniques that can collect and analyze the events occurring at components distributed across an enterprise-wide computing system in order to deliver on-the-fly responses.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

One aspect described herein provides a computer-implemented method of computer system security monitoring. Multiple event monitoring agents may be deployed across an enterprise-wide computing system such that each event monitoring agent monitors at least one event generator of the enterprise-wide computing system. The event monitoring agents may be connected to an event processing server. The event processing server may receive event information generated by the event monitoring agents that describe events occurring at the event generators. The event processing server may perform a security analysis on at least a portion of the event information received that includes applying a security policy to the event information. The event processing server may execute a security response based on the security analysis performed such as, for example, a response specified in the security policy applied.

Another aspect described herein provides a system for computer system security monitoring. Multiple event generators may operate within an enterprise-wide computing system, and multiple event monitoring agents may respectively monitor events that occur at at least one of the event generators. An event processing server may be in signal communication with the event monitoring agents and include computer-readable and executable instructions. The event processing server may receive event information generated by the event monitoring agents. The event information may describe the events that occur at the event generators. The event processing server may perform a security analysis on at least a portion of the event information received that includes applying a security policy to that event information. The event processing server may execute a security response based on the security analysis performed such as, for example, a response specified in the security policy applied.

The details of these and other aspects of the disclosure are set forth in the accompanying drawings and description below. Other features and advantages of aspects of the disclosure will be apparent from the description, drawings, and claims.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps disclosed may be optional. It will also be appreciated with the benefit of this disclosure that one or more components illustrated in the accompanying figures may be positioned in other than the disclosed arrangement and that one or more of the components illustrated may be optional.

DETAILED DESCRIPTION

In accordance with various aspects of the disclosure, methods, non-transitory computer-readable media, and apparatuses are disclosed for facilitating security monitoring at an enterprise-wide computing system. Through implementation of the techniques described below enterprises may effectively monitor events occurring at various endpoints of the computing system which provide interfaces that serve as entry points to the computing system. Potential security issues may be proactively identified through the monitoring and analysis of disparate events respectively occurring at different endpoints of the computing system. The analysis of the event may also provide solutions to potential security events to prevent a potential security event from evolving into an actual security event. Furthermore the techniques described below provide effective security monitoring without degrading the user experience provided by the interfaces of the endpoints.

In addition, various aspects of the disclosure, methods, non-transitory computer-readable media, and apparatuses are disclosed for improving the marketing efforts of an enterprise. The events occurring at the endpoints of the enterprise-wide computing system may also be analyzed to identify marketing material that is likely to be of interest to users of the computing system. The events initiated by a user at one endpoint of the enterprise-wide computing system may be provided as input to a marketing analysis, and relevant marketing material may be selected for presentation to the user when that user accesses a different endpoint of the enterprise-wide computing system. For example, the interface provided to a user by one endpoint of the enterprise-wide computing system may be customized with selected marketing material based on events that occurred at another endpoint of the computing system.

As described in further detail below, event monitoring agents may be respectively deployed to the endpoints of an enterprise-wide computing system and monitor the events occurring at those endpoints. The event monitoring agents may report those events to a centralized event processing server. The event processing server aggregates and analyzes event information reported from multiple event monitoring agents to create a web of information pertaining to those events. As described in further detail below, event processing may include predictive modeling, prediction analysis, event pattern analysis, sentiment analysis, clickstream analysis, and so forth. In this way, the system may detect and respond to events in real-time or near real-time. Each endpoint may provide a stream of event information to the event processing server. The streams of event information may be referred to as channels. Since the centralized event processing server processes and analyzes events received from multiple endpoints, the event processing server may be referred to as a cross-channel event processing server.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition, "set" as used in this description refers to a collection that may include one element or more than one element.

Moreover, aspects of the disclosure may be implemented in non-transitory computer-readable media having instructions stored thereon that, when executed by a processor, cause the processor to perform various steps described in further detail below. As used in this description, non-transitory computer-readable media refers to all computer-readable media with the sole exception being a transitory propagating signal. The instructions may be organized into one or more program modules that may be executed by one or more computers or other devices as described herein. Program modules may include routines, programs, objects, components, data structures, and the like that perform particular tasks or implement particular data types when executed by a processor in a computer or other device. The modules may be written in a source code programming language that is subsequently compiled for execution, or may be written in a scripting language that supports scripts interpreted in a run-time environment. The instructions may be stored on a computer-readable medium as described in further detail below. Accordingly aspects of the disclosure may be embodied as a method, data processing system, or computer program product. Functionality described below may therefore be embodied at least in part in software, firmware, or hardware such as integrated circuits, field programmable gate arrays (FPGA), and the like. Furthermore data structures that implement aspects of the disclosure are considered to be within the scope of the computer-readable instructions.

Figure 1:
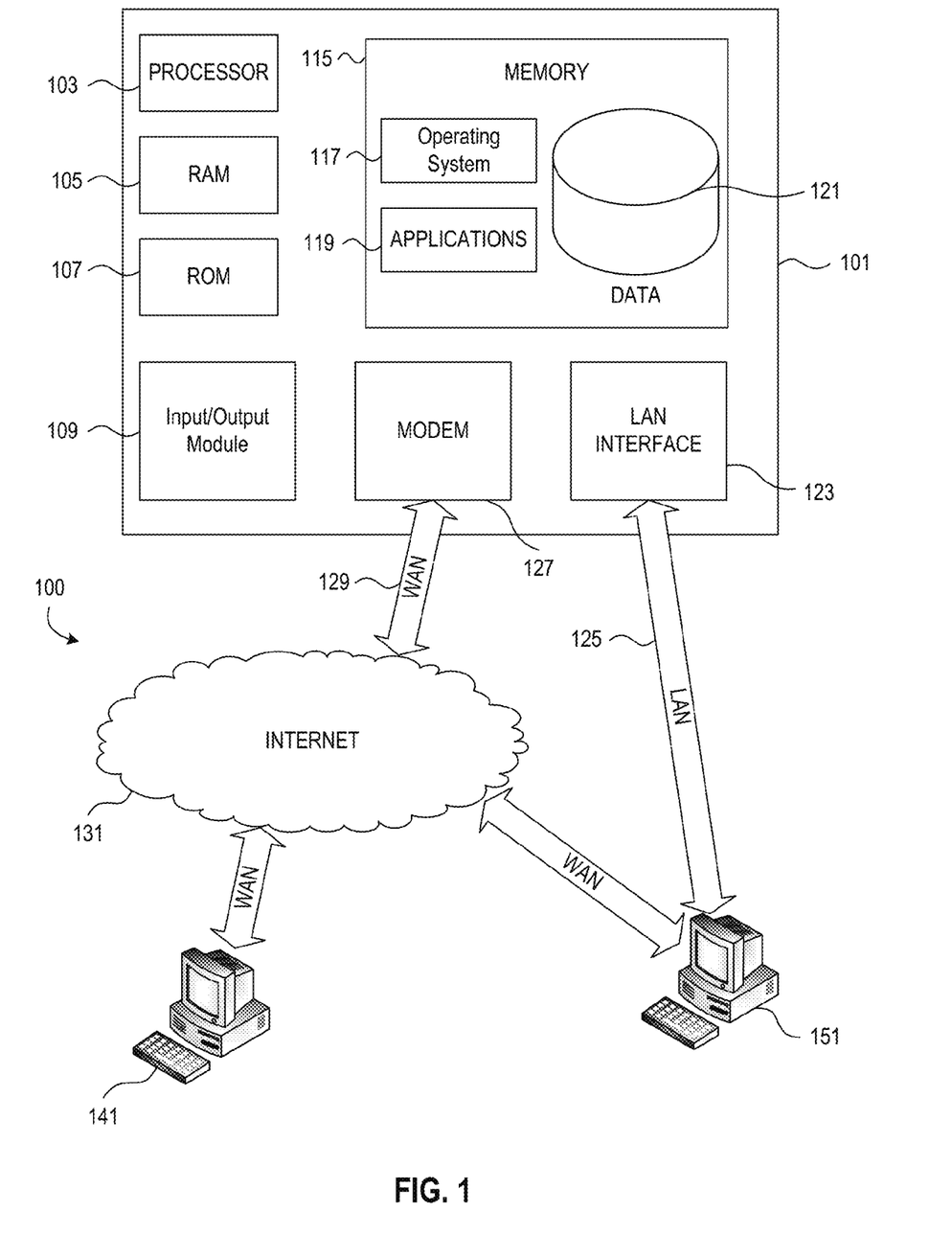
FIG. 1 is an illustrative operating environment in which various aspects of the disclosure may be implemented.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

The disclosure is operational within a special purpose computing systems and environments configured to facilitate cross-channel event processing. These special purpose computing systems and environments may include personal computers (PCs), server computers, hand-held or laptop devices, multiprocessor systems, microprocessor-based systems, programmable consumer electronics, network PCs, minicomputers, mainframe computers, distributed computing environments that include any of the systems or devices listed above, and the like.

With reference to FIG. 1, the computing system environment 100 may include a cross-channel event processing server 101 at which aspects of the disclosure may be implemented. The cross-channel event processing server 101 may have a processor 103 for controlling the its overall operation and its associated components which may include random-access memory (RAM) 105, read-only memory (ROM) 107, a communications module 109, and memory 115. The processor 103 and its associated components may allow the cross-channel event processing server 101 to run a series of computer-readable instructions related to event processing which may include prediction modeling, predictive analysis, event pattern matching, sentiment analysis, clickstream analysis and the like.

The cross-channel event processing server 101 may include a variety of computer-readable media. The computer-readable media may be any available non-transitory media that may be accessed by the cross-channel event processing server 101 and may include both volatile and non-volatile media as well as removable and non-removable media.

Computer storage media include volatile and non-volatile, removable and non-removable media implemented in any method or technology for storage of information such as computer-readable instructions, data structures, program modules, or other data. Computer storage media include, but are not limited to, random access memory (RAM), read-only memory (ROM), electronically erasable programmable read only memory (EEPROM), flash memory or other memory technology, CD-ROM discs, digital versatile discs (DVD), or other optical disk storage, magnetic cassettes, magnetic tape, magnetic disk storage or other magnetic storage devices, or any other non-transitory medium that can be used to store the desired information that can be accessed by the cross-channel event processing server 101.

The computing system environment 100 may also include optical scanners (not shown). Example uses of the optical scanners include scanning and converting paper documents, such as correspondence, data, and the like to digital files.

Although not shown, RAM 105 may include one or more applications representing the application data stored in RAM 105 while the cross-channel event processing server 101 is running and while corresponding software applications (e.g., software tasks) are executing on the cross-channel event processing server 101.

The communications module 109 may include a microphone, keypad, touch screen, stylus, or other types of input devices through which a user of the cross-channel event processing server 101 may provide input, and may also include one or more of a speaker for providing audio output and a video display device for providing textual, audiovisual, and/or graphical output.

Software may be stored within memory 115 and/or a storage device or storage media to provide instructions to the processor 103 that enable the cross-channel event processing server 101 to perform various functions. For example, memory 115 may store software used by the cross-channel event processing server 101, such as an operating system 117, application programs 119, and an associated database 121. In certain aspects, the cross-channel event processing server 101 may comprise a plurality of databases 121. Also, some or all of the computer executable instructions for the cross-channel event processing server 101 may be embodied in hardware or firmware.

The cross-channel event processing server 101 may operate in a networked environment supporting connections to one or more remote computing devices, such as computing devices 141 and 151. The computing devices 141 and 151 may be personal computing devices or servers that include many or all of the elements described above relative to the cross-channel event processing server 101.

The network connections depicted in FIG. 1 may include a local area network (LAN) 125 and a wide area network (WAN) 129, but may also include other types of networks. When used in a LAN networking environment, the cross-channel event processing server 101 may be connected to the LAN 125 through a network interface or adapter in the communications module 109. When used in a WAN networking environment, the cross-channel event processing server 101 may include a modem in the communications module 109 or other means for establishing communications over the WAN 129, which may include the Internet 131 or other type of wide-area computer network. It will be appreciated that the network connections shown are illustrative and other means of establishing a communications link between the computing devices may be used. Various well-known protocols such as TCP/IP, Ethernet, FTP, HTTP, and the like may be used. The cross-channel event processing server 101 may be operated in a client-server configuration to permit a user to retrieve web pages from a web-based server. Any of various conventional web browsers may be used to display and manipulate web pages.

Additionally, one or more application programs 119 used by the cross-channel event processing server 101, according to an illustrative embodiment, may include computer-executable instructions for invoking functionality related to communication including, for example, email, short message service (SMS), and voice input and speech recognition applications. In addition, the application programs 119 may include computer-executable instructions for invoking user functionality related to access a centralized repository for performing various service tasks like routing, logging, data storage, and protocol bridging. Application programs 119 may include various types of programs suitable for processing events in an enterprise-wide computing system including, for example, prediction modeling programs, predictive analysis programs, event pattern matching programs, sentiment analysis programs, clickstream analysis programs, and the like.

Embodiments of the disclosure may include forms of computer-readable media. Computer-readable media include any non-transitory media that can be accessed by the cross-channel event processing server 101. Storage media include volatile and nonvolatile, removable and non-removable media implemented in any method or technology for storage of information such as computer-readable instructions, object code, data structures, program modules, or other data.

Figure 2:
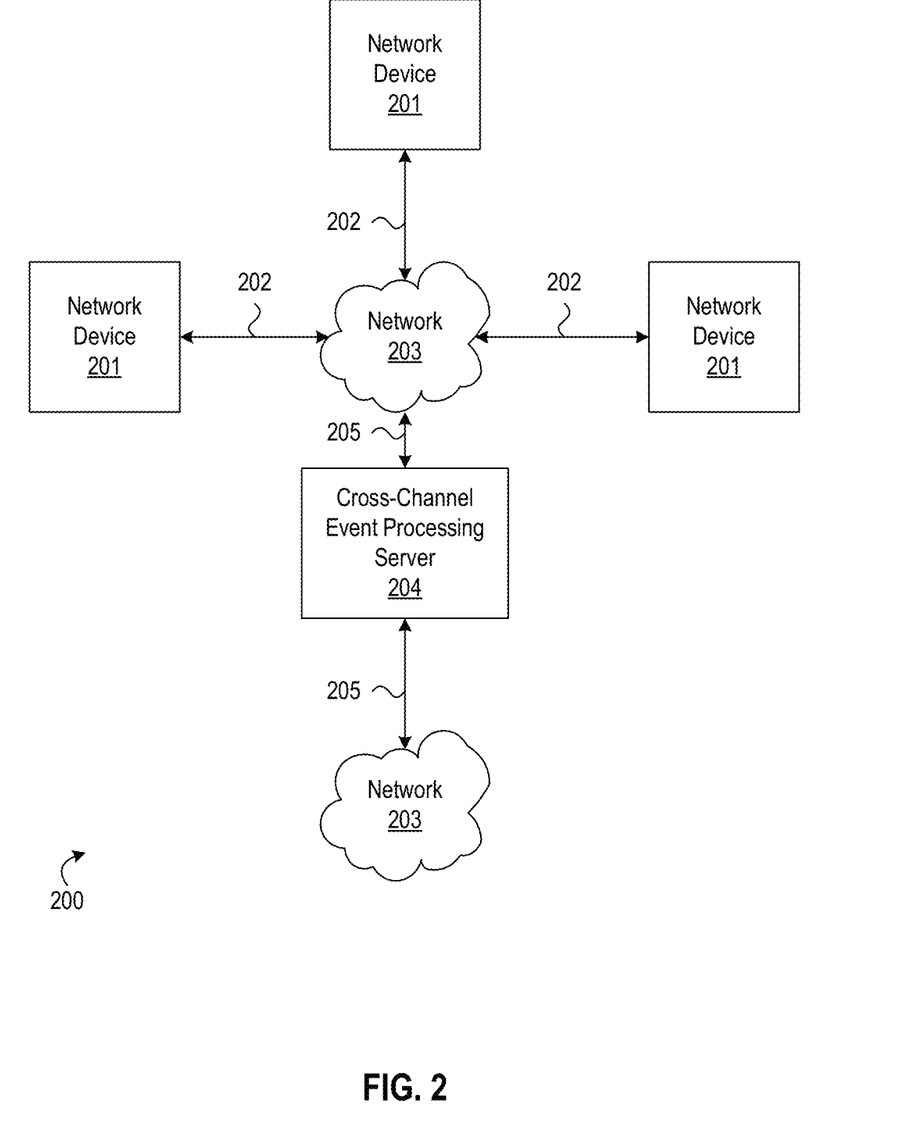
FIG. 2 is a block diagram of an example of an implementation of a cross-channel event processing system.

Referring now to FIG. 2, a block diagram of an example of an implementation of an event processing system 200 is shown. As illustrated, the event processing system 200 may include one or more network devices 201 which may, in some examples, be connected by one or more communications links 202 to computer network 203. The computer network 203 may in turn be linked via communications links 205 to a cross-channel event processing server 204. In the event processing system 200, the cross-channel event processing server 204 may be any suitable server, processor, computer, or data processing device, or combination of the same. In some example implementations the cross-channel event processing server 204 of FIG. 2 may be the same as or at least similar to the cross-channel event processing server 101 described above with reference to FIG. 1. The cross-channel event processing server 204 may be used to process input received from a user or one or more of the network devices 201.

According to one or more aspects, the event processing system 200 may be associated with an enterprise that maintains an enterprise-wide computing system. The enterprise-wide computing system may include various endpoints at which external or internal users may access the enterprise-wide computing system. The endpoints of the enterprise-wide computing system may correspond to the network devices 201 shown in FIG. 2. External users may include, e.g., customers that access the enterprise-wide computing system via various access portals such as a telephone access portal using a telephone device, a mobile access portal using a mobile application on a mobile computing device, or a web access portal using a web browser at a computing device. Internal users may include, e.g., employees of the enterprise that access the enterprise-wide computing system via various workstations and applications installed at those workstations. In some instances, the enterprise may be, for example, a financial institution such as a bank. Although it will be appreciated that the enterprise may be one of many various types of entities that maintain enterprise-wide computing systems.

The computer network 203 may be any suitable computer network including the Internet, an intranet, a wide-area network (WAN), a local-area network (LAN), a wireless network, a digital subscriber line (DSL) network, a frame relay network, and asynchronous transfer mode network, a virtual private network (VPN), or any combination of any of the same. The communications links 202 and 205 may be any communications links suitable for communicating between the network devices 201 and the cross-channel event processing server 204, such as network links, dial-up links, wireless links, hard-wired links, and the like.

Having described examples of computing devices that may be used to implement various aspects of the disclosure and an operating environment in which various aspects of the disclosure may be implemented, various embodiments are discussed in greater detail below.

As noted above, an event processing system may be implemented to collect information describing events occurring at various endpoints across the enterprise-wide computing system and leverage event information related to events occurring at one endpoint to respond to events occurring at another endpoint. Two examples described in further detail below include facilitating security monitoring across the enterprise-wide computing system and providing targeted marketing to various endpoints at the enterprise-wide computing system. Other example implementations will be appreciated with the benefit of this disclosure.

Computer System Security Monitoring Using Cross-Channel Event Processing

One way in which the cross-channel event processing system may leverage event information received from multiple endpoints of an enterprise-wide computing system is in the area of computer system security monitoring. The cross-channel event processing system advantageously identifies potential security issues based on events that, when considered individually may appear to be innocuous, but when considered collectively indicate a potential security issue. Upon identification of the potential security issue, the cross-channel event processing system may issue instructions to address the potential security issue.

Figure 3:
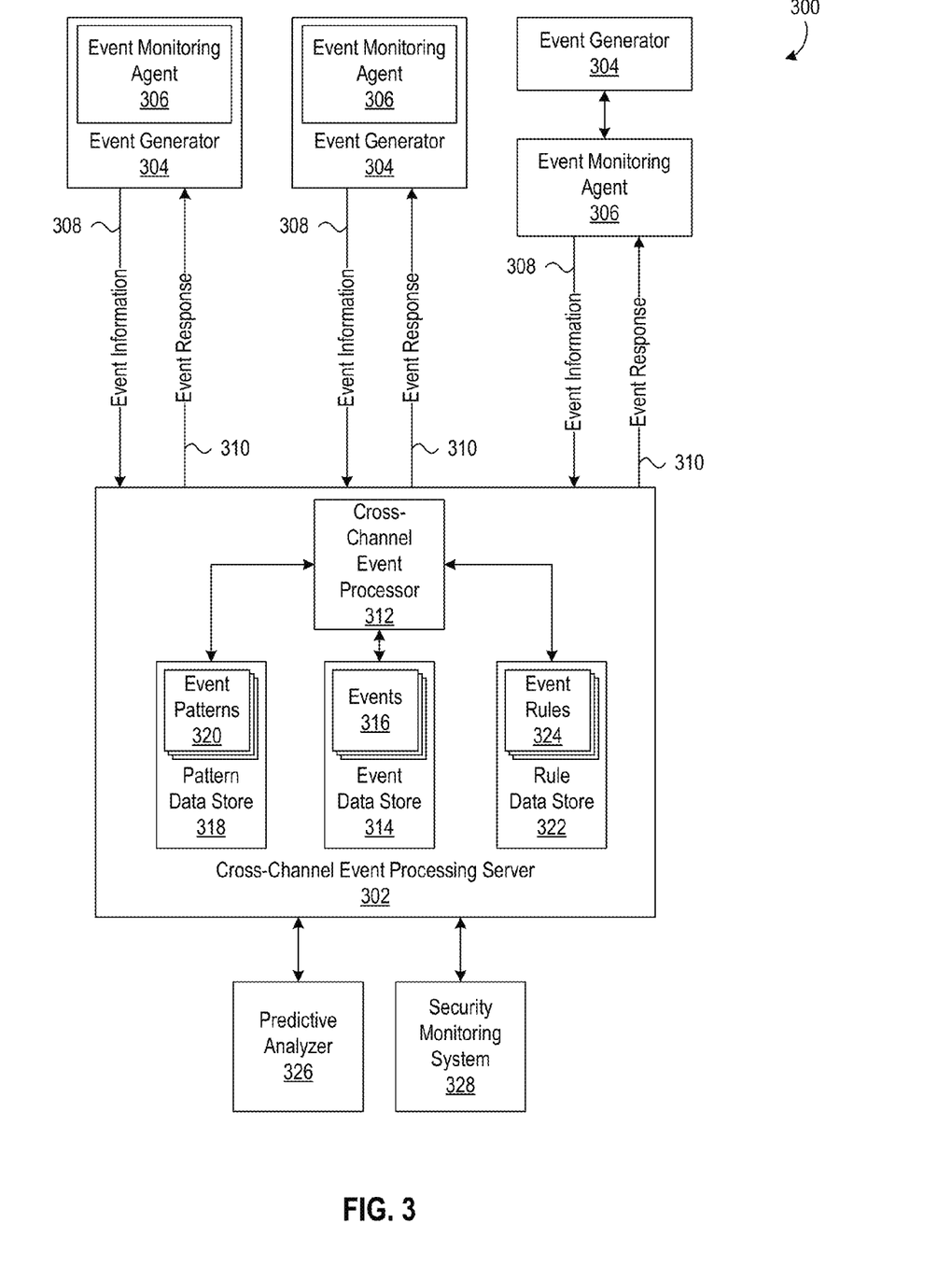
FIG. 3 is a block diagram of another example of an implementation of a cross-channel event processing system.

Referring now to FIG. 3, an example of an implementation of a cross-channel event processing system 300 is shown. The cross-channel event processing system 300, in this example, is configured for computer system security monitoring in an enterprise-wide computing system. As seen in FIG. 3, the cross-channel event processing system 300 includes a cross-channel event processing server 302 that is in signal communication with multiple event generators 304. The cross-channel event processing system 300 also includes multiple event monitoring agents 306 which have been respectively deployed to each event generator 304. The communications exchanged between the cross-channel event processing server 302 and the event monitoring agents 306 may include event information 308 sent to the cross-channel event processing server from the event monitoring agents 306. The event information 308 describes events that occur at the event generators 304. The communications exchanged between the cross-channel event processing server 302 and the event monitoring agents 306 may also include event responses 310 sent to the event monitoring agents from the cross-channel event monitoring server.

To facilitate event processing, the cross-channel event processing server 302, in this example, includes a cross-channel event processor 312 and various data stores. The data stores of the cross-channel event processing server 302, in this example, include an event data store 314 that stores information describing various events 316 that have occurred at the event generators 304, an event pattern data store 318 that describe event patterns 320, and a rule data store 322 that stores rules 324 specifying responses to events or event patterns. The data stores may implement a relational database and store the information describing the events 316, event patterns 320, and rules 324 as sets of related records, e.g., event records, event pattern records, and rule records. The cross-channel event processor 312 may thus be configured to execute various queries on the data stores 314, 318, and 322 to add, update, or retrieve records associated with events, event patterns, and rules. Although separate data stores are shown in FIG. 3, other example implementations may store the events 316, event patterns 320, and event rules 324 in a common data store. The cross-channel event processing server 302 may also be in signal communication with a predictive analyzer 326 and a security monitoring system 328 to facilitate security monitoring in an enterprise-wide computing system. Furthermore some implementations of the cross-channel event processing server may include multiple cross-channel event processors for processing events in parallel.

The event generator 304 may be any type of computing component deployed at or in signal communication with an enterprise-wide computing system. Event generators 304 may include, for example, web servers, mobile servers, application servers, virtual application servers, financial transaction systems, account maintenance systems, employee workstations, software applications installed employee workstations, telephone systems, interactive voice response systems, and any other type of hardware or software component that generates detectable events. Employee workstations may include workstations for various types of employees such as, for example, financial advisors that assist customers in maintaining investment accounts, technical advisors that assist customers with technical issues in accessing the various interface portals, customer account representatives that assist customers in maintaining customer accounts, and the like.

An event monitoring agent 306 may be installed at or connected to an event generator 304. The event monitoring agent 306 may hook into or register with the event generator 304 in order to detect events. The event generator 304 may be configured to notify the event monitoring agent 306 when an event occurs. In some example implementations, a respective event monitoring agent 306 may be deployed to each event generator 304 of an enterprise-wide computing system. In other implementations, one event monitoring agent 306 may monitor events that occur at or are associated with multiple event generators, e.g., multiple applications operating at a workstation. The event monitoring agents 306 may include a filter that filters user input, system input, event log information, and the like before it is sent to the cross-channel event processing server 302.

Events include actions that occur at or are associated with the event generators 304. Events may include actions initiate by a user or events initiated by the event generator itself. Some examples of events that may be detected using the event monitoring agents 306 include web page requests, web link selections, menu item selections, telephone menu selections, user interface input, communication events (e.g., web page request events, email events, text message events, telephone call events, and the like), financial transaction events (e.g., purchase events, trade events, transfer events, and the like), account modification events (e.g., open account events, close account events, add account feature event, remove account feature event, and the like), credential modification events (e.g., username reset events, password reset events, and the like), sensor activation, and other actions that event generators 304 may perform or be associated with.

In response to detection of an event, the event monitoring agent 306 may provide event information 308 to the cross-channel event processing server 302. The event information may identify the event generator 304 that generated the event (e.g., via a universally unique identifier—UUID), the date and time the event occurred, and the event type. The event information may also identify one or more individuals associated with the event (e.g., via a user identifier). Individuals associated with the event may include the individual that initiate the event as well as one or more individuals affected by the event. For example, the individuals associated with a communication may include the individual that sent the communication and the recipients of that communication. As another example, the individuals associated with an account modification event may be the customer that requested modification of the account as well as the customer service representative that performed the account modification.

The event monitoring agents 306, in some example implementations, may be configured to initiate and send event notifications to the cross-channel event processing server 302. The event notifications may include the event information 308 that describes the events occurring at the event generators 304. An event monitoring agent 306 may be configured to send an event notification for each event that occurs at an event generator 304. An event monitoring agent may be configured to send event notifications individually or collectively, e.g., at periodic intervals. In addition or as an alternative, the event monitoring agents 306 may be configured to write event information to respective event logs associated with the event generators 304, and the cross-channel event processing server 302 may be configured to periodically query the event logs to acquire the event information 308 that describes the events occurring at the event generators 304.

In response to receipt of event information 308 describing an event that has occurred at the event generator 304, the cross-channel event processor 312 of the cross-channel event processing server 302 may create a new event record at the event data store 314. It will thus be appreciated that the cross-channel event processing server 302 collects and aggregates event information 308 that respectively describes events occurring at disparate event generators 304 distributed across an enterprise-wide computing system. With the event information 308 collected and aggregated at a central location (e.g., the event data store 314), the cross-channel event processor may perform process the event information. To process the event information, the cross-channel event processor 312 may be configured to select sets of events and perform queries on the event information associated with the selected events. The queries may be configured to operate over time and within buffer windows. Processing the event information may include comparing event information associated with multiple events to one or more event patterns 320 stored in the pattern data store 318. Event patterns 320 may be associated with event rules 324. If the cross-channel event processor 312 determines a set of events matches an event pattern 320, then the event rule 324 associated with that event pattern may be retrieved, and an event response 310 specified by the selected event rule may be performed as a preventative or corrective measure. Event types may also be associated with an event rule 324 stored at the rule data store 322. If the cross-channel event processor 312 receives event information 308 for a particular event type, the cross-channel event processor may retrieve the event rule 324 associated with that event type and likewise perform an event response 310 specified by the selected event rule. The event response 310 may be, for example, one or more instructions or notifications issued to one of the event generators 304 from the cross-channel event processing server 302.

Processing the event information may include performing a predictive analysis on event information 308 from multiple event generators 304. The predictive analyzer 326 in signal communication with the cross-channel event processing server 302 may be configured to perform the predictive analysis. Accordingly the cross-channel event processing server 302 may provide the predictive analyzer 326 information related to the events 316 stored at the event data store 314. In FIG. 3, the predictive analyzer 326 is shown to be separate from the cross-channel event processing server 302. In other example implementations, the predictive analyzer 326 may be a component of a cross-channel event processing server, e.g., and a predictive processor that retrieves information from an event data store. The predictive analysis may employ one or more predictive models to generate a prediction score associated with the set of events occurring at the event generators 304. The predictive analyzer 326 may utilize the predictive models to correlate events that occur at different event generators 304 across the enterprise-wide computing system. The predictive models may be adjusted, for example, in real-time based on events leading up to a transaction, and a predictive score for the potential transaction may be determined before the transaction is executed.

In the context of computer system security monitoring, event processing may include performing a security analysis using the cross-channel event processor 312 of the cross-channel event processing server 302. The rules 324 stored at the rule data store 322 may include security policies applied during the security analysis. The security policy may specify a response to be performed upon detection of an event or set of events that match one of the event patterns 320 in the pattern data store 318 or that result is a prediction score provided by the predictive analyzer 326 that is above a predetermine prediction threshold. The prediction score, in the security monitoring context, may be a security prediction score that quantifies the likelihood that the set of detected events correspond to a potential security issue. The security analysis may thus be event-driven and rule based. The cross-channel event processor 312 may initiate event processing in response to receipt of event information 308 from or, additionally or alternatively, at periodic intervals (e.g., every x number of milliseconds, seconds, and the like). As noted above, the cross-channel event processing server 302 may perform multiple security analyses simultaneously in parallel using multiple cross-channel event processors similar to cross-channel event processor 312. The security analysis may analyze the types of events that occur as well as the timing of those events.

Based on the security analysis, the cross-channel event processing server 302 may initiate an event response 310 as described above. The event response may be specified by the security policy. For security analyses, event responses 310 may include notifications to an external security monitoring system 328. The security monitoring system 328 may be utilized by security monitoring teams that are tasked with responding to potential security events. Upon receiving an event response at the security monitoring system 328, the security monitoring system may create a new record of the potential security issue and, in turn, notify a member of a security monitoring team tasked with investigating the potential security issue (e.g., via email). The event response 310 may also include instructions to one or more of the event generators 304 or, additionally or alternatively, the event monitoring agents 306. The instructions included in the event response 310 may, for example, instruct the event generator to prevent a subsequent transaction from occurring at the event generator, halt a current transaction occurring at the event generator, display a message at an interface provided by the event generator, and the like.

The following example scenario is provided to illustrate how the cross-channel event processing system 300 may be employed to facilitate security monitoring in an enterprise-wide computing system. A password change request may be received at an interactive voice response (IVR) system, one of the event generators 304 of the enterprise-wide computing system. An event monitoring agent may monitor events occurring at the IVR system and transmit an event notification to the cross-channel event processing server 302 describing the password change request. In response to receipt of the event notification, the cross-channel event processor 312 of the cross-channel event processing server 302 may create a new record of the event at the event data store 314. Subsequent to the password change event, a money transfer request may be received via a customer account web server, another one of the event generators 304 of the enterprise-wide computing system. An event monitoring agent may monitor events occurring at the customer account web server and transmit an event notification to the cross-channel event processing server 302 describing the money transfer request. In response to receipt of the event notification, the cross-channel event processor 312 of the cross-channel event processing server 302 may create a new record of the event at the event data store 314.

As noted above, these events, when considered individually, might not be indicative of a potential security issue as changing passwords and transferring money are each within the bounds of typical system use. When such events occur relatively close in sequence, however, a potential security issue may exist. Accordingly the cross-channel event processor 312 may initiate a security analysis of the event information 308 received in the event notifications. During the security analysis, the cross-channel event processor 312 may compare the event information to one or more event patterns 320 in the pattern data store in order to determine the similarity of one or more events to an event pattern. The pattern data store 318 may include an event pattern 320 that defines a sequence of events that includes a password change followed by a money transfer request. The cross-channel event processor 312 may also utilize the predictive analyzer 326 during the security analysis to generate a prediction score associated with the event patterns 320 or the sequence of events being analyzed. The event pattern 320 may be associated with a security policy stored as a rule 324 in the rule data store 322. The security policy may specify that when a money transfer request is received within x amount of time after a password change request occurs then a potential security issue exists. The security policy, in this example, may specify that a money transfer request that follows relatively soon after a password change request should be halted. To apply the security policy, the cross-channel event processor 312, in this example, may transmit an event response 310 to the customer account web server with instructions to halt the money transfer request. Upon receiving the event response 310, the customer account web server may, for example, display an error message at the customer account web interface indicating that the money transfer request could not be completed and that the user should contact a customer service representative. The cross-channel event processor 312 may also notify a security monitoring system 328 identifying the potential security issue as described above.

The cross-channel event processing server 302 may process and analyze events associated with other scenarios as well. One other example scenario may involve a stolen credit card notification followed by a money transfer request. Another example scenario may involve a monetary transaction for an amount x % above the average monetary transaction for the account followed by a subsequent monetary transaction within y amount of time also for an amount x % above the average monetary transaction. An additional example scenario may involve a sequence of monetary transaction each from a different location where the transactions collectively total x % of the overall account value. A further example scenario may involve multiple monetary transactions over one day where the transactions collectively total less than x % of the overall account value. Responses to these example scenarios may include notifying a security monitoring team, halting or cancelling the transaction, suspending the account, and the like. Additional scenarios will be appreciated with the benefit of this disclosure. To detect scenarios involving event sequences, event patterns, and the like, a cross-channel event processing system may perform a security monitoring process.

Figure 4:
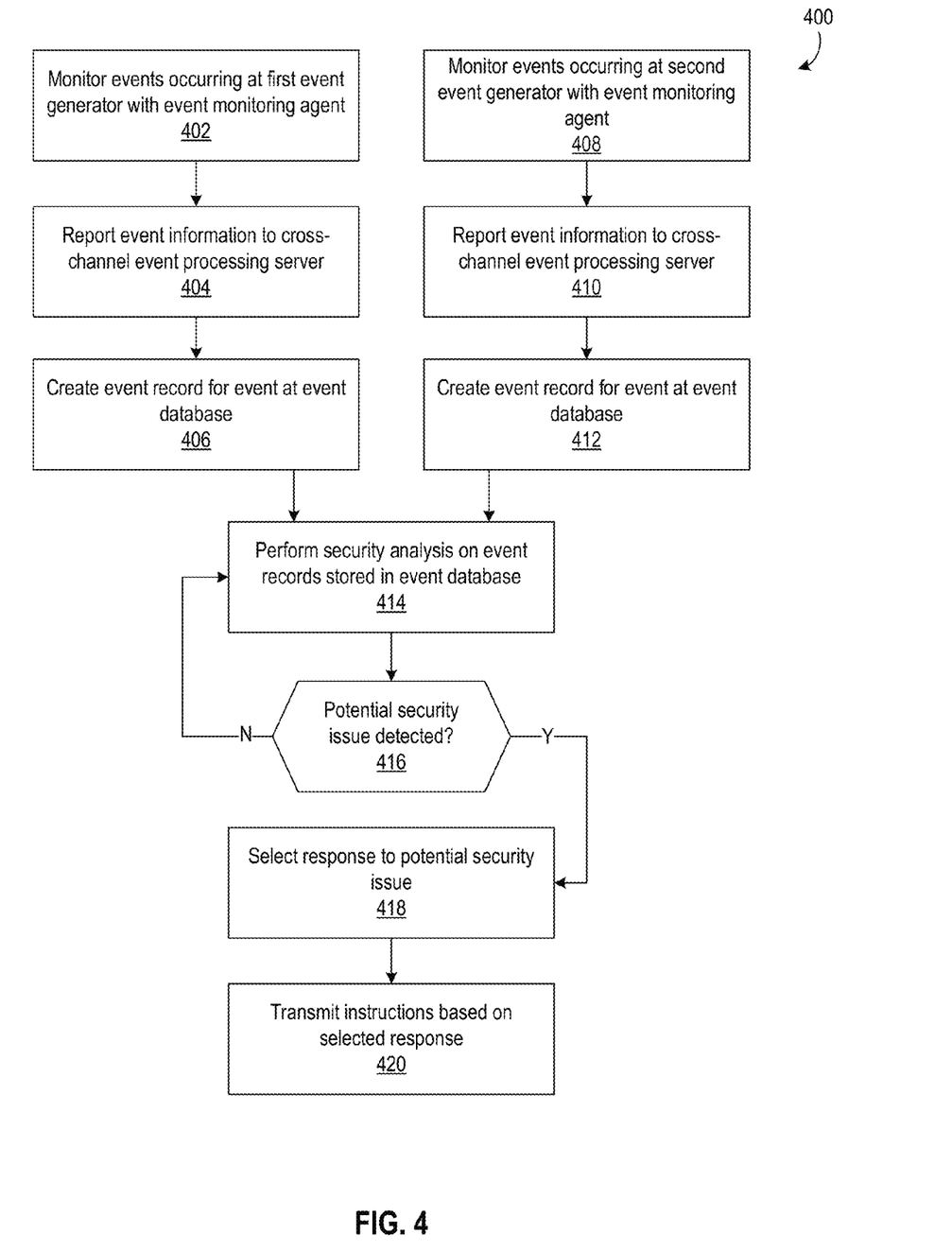
FIG. 4 is a flowchart of example method steps for performing computer system security monitoring with a cross-channel event processing system is shown.

In FIG. 4, a flowchart 400 of example method steps for performing computer security monitoring with a cross-channel event processing system is shown. Event monitoring agents may be respectively deployed at or connected to event generators of an enterprise-wide computing system as described above. An event monitoring agent may monitor the events occurring at an event generator (block 402) and report event information that describe those events to a cross-channel event processing server (block 404). The cross-channel event processing server may create records for those events at an event database (block 406). Another event monitoring agent may monitor other events occurring at another event generator (block 408) and likewise report event information that described those other events to the cross-channel event processing server (block 410). The cross-channel event processing server may similarly create records for those other events at the event database.

The cross-channel event processing system may then perform a security analysis of the events stored in the event database (block 414). As described above, the security analysis may be triggered by receipt of event information from one of the event generators or may be regularly performed on a periodic basis. As also described above, the security analysis may include comparisons to event patterns, performance of predictive analysis to obtain a prediction score for a set of events, application of rules, security policies, and the like. If the security analysis does not indicate a potential security issue exists (block 416:N), the cross-channel event processing system may repeat performance of the security analysis to include subsequent event information that has since been received. If the security analysis indicates, however, that a potential security issue exists (block 416:Y), then the cross-channel event processing system may select a response to the potential security issue (block 418). The response selected may include transmitting instructions based on the selected response (block 420), e.g., to one or more of the event generators at which one or more of the events occurred or to one or more of the event monitoring agents that monitor those event generators.

Additional and alternative implementations of the cross-channel event monitoring system, the method of facilitating computer system security monitoring, and the method of processing event information received from multiple event generators of an enterprise-wide computing system will be appreciated with the benefit of this disclosure.

Targeted Marketing Using Cross-Channel Event Processing

Another way in which the cross-channel event processing may leverage event information received from multiple endpoints of an enterprise-wide computing system is in the area of targeted marketing. In the context of targeted marketing, the events of the event generators of an enterprise-wide computing system may be associated with inquiries received from individuals regarding goods and services available for purchase. The cross-channel event processing system advantageously identifies marketing elements to present to a user at one interface provided by an enterprise-wide computing system based on input received from that user at another interface provided by the enterprise-wide computing system.

Figure 5:
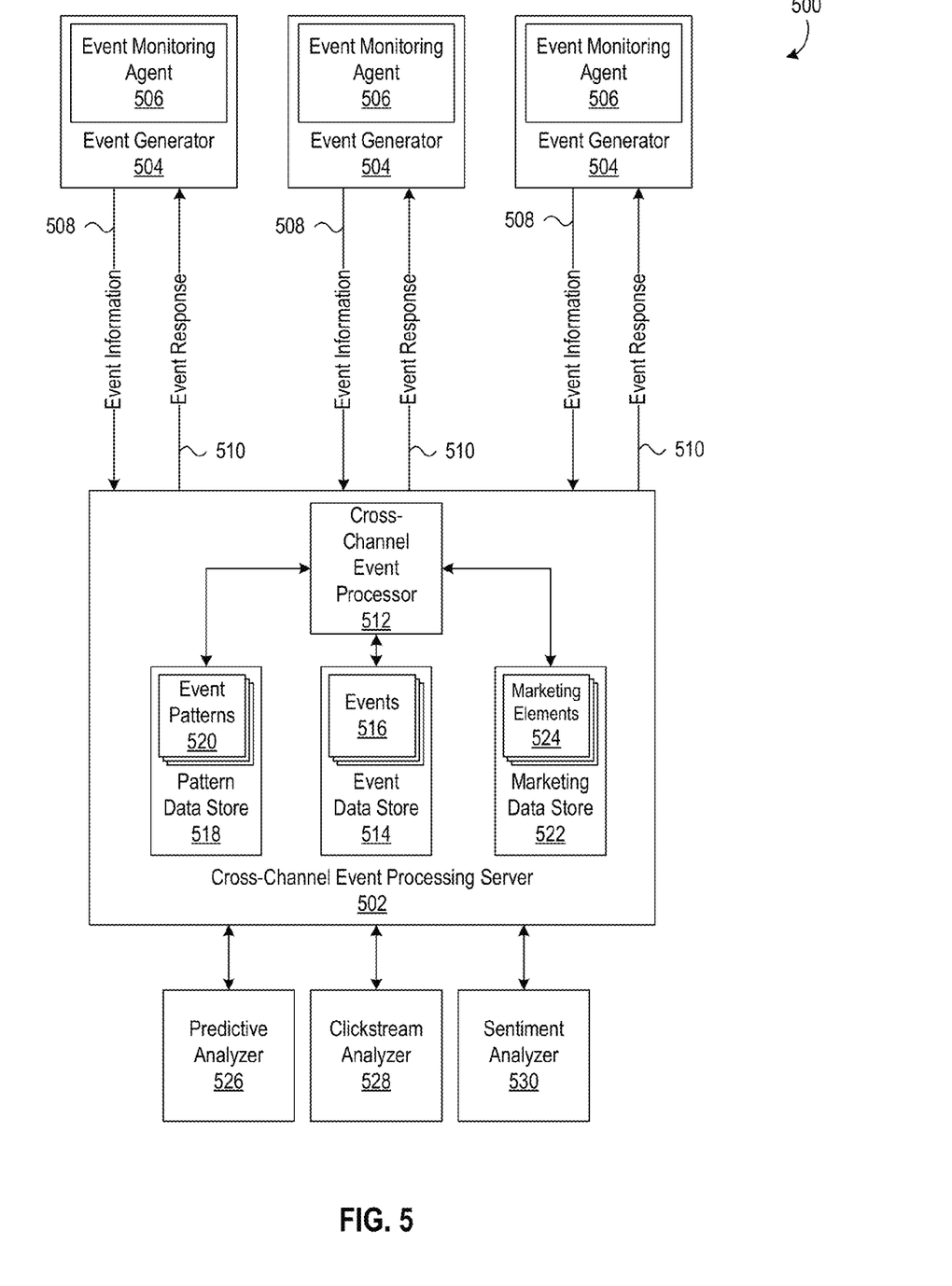
FIG. 5 is a block diagram of a further example of an implementation of a cross-channel event processing system.

Referring now to FIG. 5, another example of an implementation of a cross-channel event processing system 500 is shown. The cross-channel event processing system 500 and its components may be similar to the cross-channel event processing system 300 and the corresponding components discussed above with reference to FIG. 3. The cross-channel event processing system 500, in this example however, is configured for targeted marketing in an enterprise-wide computing system. As seen in FIG. 5, the cross-channel event processing system 500 includes a cross-channel event processing server 502. The cross-channel event processing server 502 is similarly in signal communication with multiple event generators 504 at which respective event monitoring agents 506 are deployed. The event monitoring agents 506 may similarly exchange communications with the cross-channel event processing server 502 that include event information 508 describing events occurring at the event generators 504 as well as event responses 510 selected based on marketing analyses performed by the cross-channel event processing server.

The cross-channel event processing server 502, in this example, similarly includes a cross-channel event processor 512 and various data stores. The data stores of the cross-channel event processing server 502, in this example, include an event data store 514 that stores information describing various events 516 that have occurred at the event generators 504, an event pattern data store 518 that describe event patterns 520, and a marketing data store 522 that stores marketing elements 524 available for selection by the cross-channel event processor 512. The data stores may implement a relational database and store the information describing the events 516, event patterns 520, and marketing elements 524 as sets of related records, e.g., event records, event pattern records, and marketing element records. The marketing elements 524 may also be stored at the marketing data store 522 as, e.g., image files, text files, video files, audio files, animation files, links, instruction sets, and combinations of such. The cross-channel event processor 512 may thus be similarly configured to execute various queries on the data stores 514, 518, and 522 to add, update, or retrieve records and other information associated with events, event patterns, and marketing elements. The cross-channel event processing server 502, in this example, may similarly be in signal communication with a predictive analyzer 526 as well as a clickstream analyzer 528, and a sentiment analyzer 530 to facilitate marketing analyses performed for endpoints of an enterprise-wide computing system.

An event monitoring agent 506 may similarly be configured to notify the cross-channel event processing server 502 when events occur at the event generators 504 as described above. For marketing analyses, relevant events may include events associated with input provided by a user, e.g., web page requests, web link selections, menu item selections, telephone menu selections, voice input, and financial transactions. The cross-channel event processor 512 may receive event information 508 corresponding to user input and create event records corresponding to that user input at the event data store 514. The cross-channel event processor 512 may then process the event information 508 receive, which may include performing a marketing analysis.

Performing the marketing analysis may include, for example, performing a predictive analysis using the predictive analyzer 526, e.g., to obtain one or more prediction scores based on the event information 508 received. In the context of targeted marketing the prediction scores may be marketing prediction scores that indicate the likelihood that an individual would be interested in receiving one or more of the marketing elements 524 when subsequently accessing another one of the event generators 504 of the enterprise-wide computing system. The cross-channel event processor 512 may utilize the results of the predictive analysis when selecting one or more marketing elements 524 from the marketing data store 522.

Performing the marketing analysis may also include performing a clickstream analysis using the clickstream analyzer 528. The clickstream analyzer 528 may analyze event information 508 provided in response to the web pages visited and the web links selected during a web session at a web server of the enterprise-wide computing system. The clickstream analyzer may also consider the amount of time spent on respective web pages during a web session. The cross-channel event processor 512 may also utilize the results of the clickstream analysis when selecting one or more marketing elements 524 from the marketing data store 522. The results of the clickstream analysis may also be used to create and define new event patterns 520 for storage at the pattern data store 518.

Performing the marketing analysis may further include performing a sentiment analysis using the sentiment analyzer 530. The sentiment analyzer 530 may analyze communications received from an individual at one of the event generators 504 of the enterprise-wide computing analysis system, e.g., voice communications received via a telephone system or IVR system, email messages received via an email system, or comments or reviews received at a web page provided by a web server. The sentiment analyzer 530 may determine if the content of the communication is positive or negative, if an individual is satisfied or dissatisfied, and the like. The sentiment analyzer 530 may employ one or more of natural language processing, statistics, and machine learning to extract, identify, or otherwise characterize the sentiment of input received from individual via the event generators 504.

In some example implementations, the cross-channel event processor 512 may perform a combination of predictive analyses, clickstream analyses, and sentiment analyses when performing a marketing analysis in order to provide a hybrid approach to event processing. By processing and analyzing events from multiple event generators 504 distributed across an enterprise-wide computing system, the cross-channel event processing server may acquire a web of information that may be advantageously analyzed to, for example, improve the selection of marketing elements 524 presented to an individual that accesses the enterprise-wide computing system from multiple event generator 504. The events occurring at one event generator in response to access by an individual may influence the marketing elements 524 selected to subsequently present to the individual at another one of the event generators 504.

As an example, a customer may initiate a telephone call to an interactive voice response system of an enterprise-wide computing system. An event monitoring agent 506 may monitor the telephone menu selections and answers provided by the individual during the call. In response to receipt answers or menu selections, the event monitoring agent 506 may provide event information 508 to the cross-channel event processor 512 describing those answers and menu selections. The cross-channel event processor 512 may then, in turn, create and store new event records in the event data store 514 corresponding to the event information received. The event monitoring agent 506 or the cross-channel event processor 512 may also process the event information 508 to extract one or more buzzwords from the input (e.g., "mutual fund," "market research," "investments," and the like). The cross-channel event processor 512 may also perform a marketing analysis based on the event information 508 received and select one or more marketing elements 524 based on the marketing analysis (e.g., promotional materials for various mutual funds, explanatory materials discussing market research, and the like). The user may then access a personal investment account web page via an investment account web server. An event monitoring agent 506 that monitors the web server may transmit event information 508 to the cross-channel event processing server 502 describing the login event. The cross-channel event processor 512 may create and store a new event record in the event data store 514 and determine that one or more marketing elements 524 have been selected for presentation to the user. The cross-channel event processor 512 may then provide an event response 510 to the web server that includes instructions to present one or more of the selected marketing elements at a web page provided to the individual. The event response 510 may instruct the web server to display the selected marketing elements 524 at a particular location on a web page, e.g., in an advertisement banner, in a list of menu items available for selection, in a list of web links available for selection, and the like. In some implementations, the selected marketing element 524 may be a web page itself, and the event response 510 may be instructions to provide the selected web page to the individual.

In this way, user input received at one event generator 504 of an enterprise-wide computing system may advantageously influence the information and configuration of interfaces provided at other event generators. As another example, a marketing analysis may include performance of a clickstream analysis on the links selected and web pages visited by an individual to determine that the individual is interested in a home mortgage. The individual may then initiate a telephone call to the IVR system, and the cross-channel event processing server 502 may instruct the IVR system to configure the menu item selections such that the first selection is directed toward obtaining a home mortgage. As a further example, the marketing analysis may identify marketing elements 524 to provide to individuals as printed marketing materials via a terrestrial mail system based on the input received from those individuals at the event generators 504, e.g., based on web links selected at a web page provided by a web server of the enterprise-wide computing system or based on menu item selections or voice communications provided to an IVR system or telephone system of the enterprise-wide computing system. The cross-channel event processor 512, in this example, may select one or marketing elements 524 from the marketing data store 522 and provide the marketing elements to a printing system that prints hardcopy marketing materials that include the selected marketing elements and are addressed to the individual.

Although the cross-channel event processing system 500, in this example, is configured for targeted marketing, other implementations of a cross-channel event processing system may be configured for multiple types of event processing, e.g., both computer system security monitoring and targeted marketing.

Figure 6:
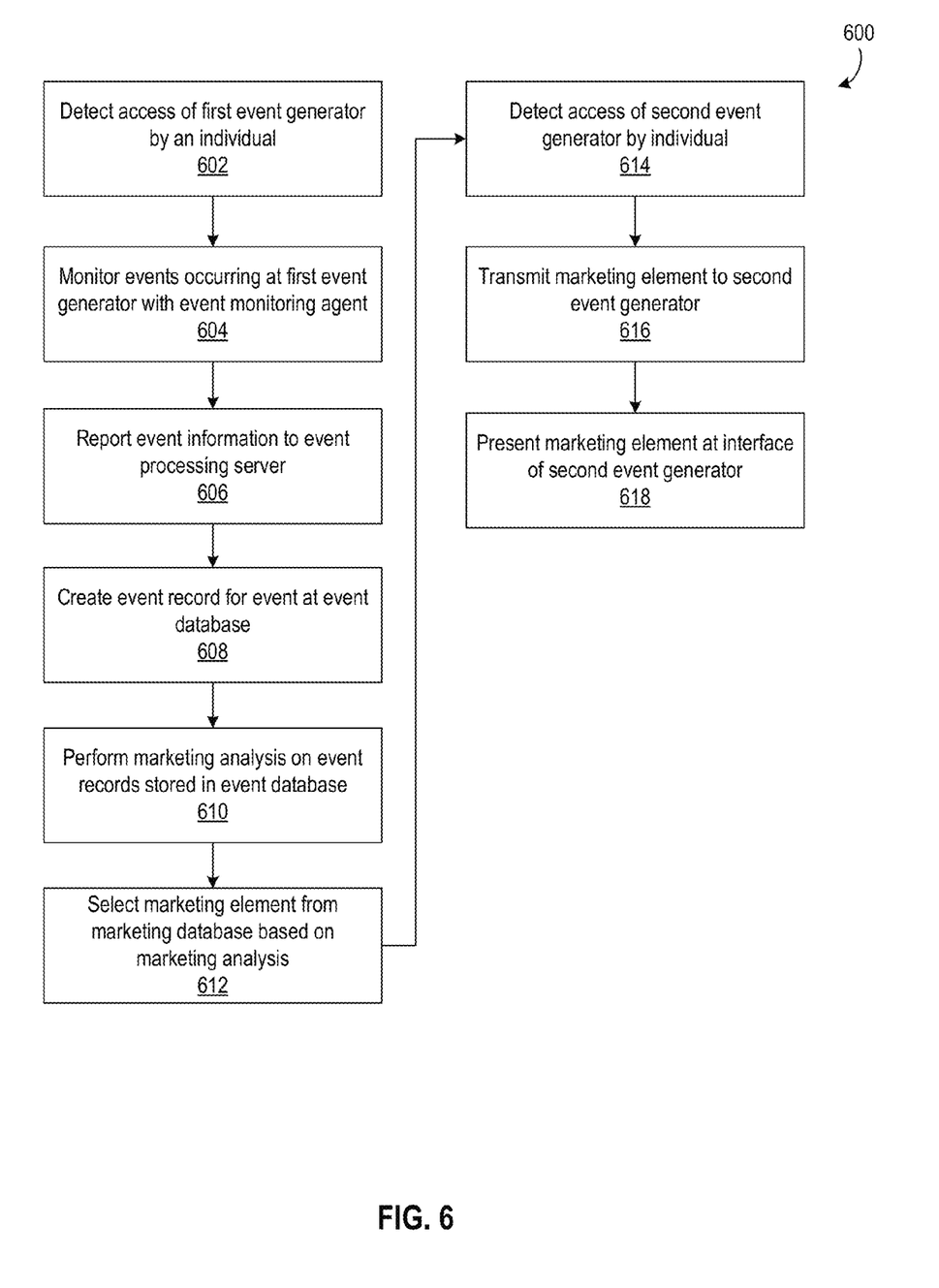
FIG. 6 is a flowchart of example method steps for performing targeted marketing with a cross-channel event processing system.

To detect scenarios involving event sequences, event patterns, and the like, a cross-channel event processing system may perform a marketing analysis process. In FIG. 6, a flowchart 600 of example method steps for performing targeted marketing with a cross-channel event processing system is shown. Event monitoring agents may be deployed across an enterprise-wide computing system (block 602) to monitor events occurring at the event generators of the enterprise-wide computing system as described above. The events occurring at a first event generator may be monitored with a first event monitoring agent (block 604). That event monitoring agent may report to a cross-channel event processing server event information that describes the events occurring at the event generator (block 606). As described above, the events may occur at the event generator in response to input received or actions performed by the individual at an interface provided by the event generator. The event processing server may, in response, create an event record corresponding to the event at an event database (block 608). The cross-channel event processing server may repeat this event reporting process and this event record creation process for additional event information received from the event monitoring agents deployed across the enterprise-wide computing system.

The cross-channel processing server may perform a marketing analysis on the event records stored in the event database (block 610). As noted above, the marketing analysis may include performance of a predictive analysis, clickstream analysis, and sentiment analysis. Based on the marketing analysis, the cross-channel event processing server may select one or more marketing elements from a marketing database (block 612) to provide to an individual. Selecting the marketing elements may include flagging the marketing elements for presentation at a later time, e.g., in response to a subsequent event generated in response to input provided or actions performed by the individual The cross-channel event processing server may, for example, select a subset of marketing elements based on a first event as candidates for subsequent selection based on a subsequent second event. The cross-channel event processing server, in this example, may then select one of the candidate marketing elements depending on the type of second event that occurs. Additionally or alternatively, the cross-channel event processing server may select and present the selected marketing element in response to the event in real time or near real time.

In some example implementations, the marketing element may be selected in response to a subsequent event that occurs at a different event generator. Accordingly an event monitoring agent that monitors another one of the event generators may detect a subsequent event occurring at that event generator (block 614). The event may be, for example, access by the individual of an interface provided by that event generator, e.g., a web page, a telephone menu, and the like. In response to receipt of event information describing the occurrence of that subsequent event, the cross-channel event processing server may transmit a selected marketing element to that event generator (block 616). In response to receipt of the marketing element, the event generator may present the received marketing element at the interface it provides to the individual (block 618).

Additional and alternative implementations of the cross-channel event monitoring system, the method of facilitating computer system security monitoring, and the method of processing event information received from multiple event generators of an enterprise-wide computing system will be appreciated with the benefit of this disclosure.

Additional Details

Moreover, aspects of the disclosure may be implemented in non-transitory computer-readable media having instructions stored thereon that, when executed by a processor, cause the processor to perform various steps described in further detail below. As used in this description, non-transitory computer-readable media refers to all computer-readable media with the sole exception being a transitory propagating signal. The instructions may be organized into one or more program modules that may be executed by one or more computers or other devices as described herein. Program modules may include routines, programs, objects, components, data structures, and the like that perform particular tasks or implement particular data types when executed by a processor in a computer or other device. The modules may be written in a source code programming language that is subsequently compiled for execution, or may be written in a scripting language that supports scripts interpreted in a run-time environment. The instructions may be stored on a computer-readable medium as described in further detail below. Accordingly aspects of the disclosure may be embodied as a method, data processing system, or computer program product. Functionality described below may therefore be embodied at least in part in software, firmware, or hardware such as integrated circuits, field programmable gate arrays (FPGA), and the like. Furthermore data structures that implement aspects of the disclosure are considered to be within the scope of the computer-readable instructions.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. The described implementation includes software but may be implemented as a combination of hardware and software or in hardware alone. Additionally, although aspects of the present disclosure are described as being stored in memory, one skilled in the art will appreciate that these aspects can also be stored on other types of computer-readable media, such as secondary storage devices, like hard disks, floppy disks, CD-ROM discs, flash memory sticks, and so forth.

What is claimed is:

1. A computer-implemented method of computer system security monitoring:
    deploying a first event monitoring agent and a second event monitoring agent across an enterprise-wide computing system wherein the first event monitoring agent monitors events occurring at a first event generator accessed by a first device of a first type via a first portal into the enterprise-wide computing system and wherein the second event monitoring agent monitors events occurring at a second event generator accessed by a second device of a second type different from the first type via a second portal into the enterprise-wide computing system;
    connecting the first and second event monitoring agents to an event processing server;
    receiving, at the event processing server, first event information generated by the first event monitoring agent describing a first event that occurred at the first event generator in response to a first communication received from the first device via the first portal;
    receiving, at the event processing server, second event information generated by the second event monitoring agent describing a second event that occurred at the second event generator in response to a second communication received from the second device via the second portal;
    performing, by the event processing server, a security analysis that comprises applying a security policy to the first event information and the second event information and performing a predictive analysis on the first event information and the second event information to obtain a security prediction score that quantifies a likelihood that the first event and the second event correspond to a potential security issue, wherein performing the predictive analysis includes comparing a sequence of the first event, the first event including a transaction amount at least a predetermined percentage over an average amount of a transaction, and the second event, the second event including a transaction amount at least the predetermined percentage over the average amount of a transaction, and a time between the occurrence of the first event and the second event, to one or more event patterns,
    wherein the security prediction score is based on a similarity of the first event and the second event to the one or more event patterns;
    determining, by the event processing server, that the security prediction score is above a predetermined threshold; and
    executing, by the event processing server, a security response based on the security analysis performed and the determining that the security prediction score is above a predetermined threshold.

2. The method of claim 1 wherein the first and second event generators are selected from the group consisting of: i) an interactive voice response system, ii) a financial transaction system, iii) an account maintenance system, iv) an application server, and v) a software application installed at a workstation.

3. The method of claim 1 further comprising:
    creating, by the event processing server, a first event record in an event database corresponding to the first event information; and
    creating, by the event processing server, a second event record in the event database corresponding to the second event information.

4. The method of claim 1 wherein:
    receiving the first event information comprises receiving a first event notification from the first event monitoring agent; and
    receiving the second event information comprises receiving a second event notification from the second event monitoring agent.

5. The method of claim 1 wherein:
    the first event information comprises first event log information saved to a first event log by the first event monitoring agent; and
    the second event information comprises second event log information saved to a second event log by the second event monitoring agent.

6. The method of claim 1 wherein executing the security response comprises issuing, to at least one of the first or second event monitoring agents, an instruction to halt at least one of the first event or the second event.

7. The method of claim 6 wherein executing the security response further comprises transmitting a notification to an individual associated with a security monitoring team.

8. A system for computer system security monitoring comprising:
    a plurality of event generators operating at an enterprise-wide computing system, the plurality of event generators comprising a first event generator accessed by a first device of a first type via a first portal into the enterprise-wide computing system and a second event generator accessed by a second device of a second type different from the first type via a second portal into the enterprise-wide computing system;

a first event monitoring agent that monitors events occurring at the first event generator;
a second event monitoring agent that monitors events occurring at the second event generator; and
an event processing server in signal communication with the first and second event monitoring agents wherein the event processing server comprises memory storing computer-readable instructions that, when executed, cause the event processing server to:
 i) receive first event information generated by the first event monitoring agent that describes a first event that occurred at the first event generator,
 ii) receive second event information generated by the second event monitoring agent that describes a second event that occurred at the second event generator,
 iii) perform a security analysis that includes applying a security policy to the first event information and the second event information, and performing predictive analysis on the first event information and the second event information to obtain a security prediction score that quantifies a likelihood that the first event and the second event correspond to a potential security issue, wherein the predictive analysis is performed by comparing a sequence of the first event, the first event including a transaction amount at least a predetermined percentage over an average amount of a transaction, and the second event, the second event including a transaction amount at least the predetermined percentage over the average amount of a transaction, and a time between the occurrence of the first event and the second event to one or more event patterns, and wherein the security prediction score is based on similarity of the first event and the second event to the one or more event patterns,
 iv) determining that the security prediction score is above a predetermined threshold,
 v) executing a security response based on the security analysis performed and the determining that the security prediction score is above a predetermined threshold.

9. The system of claim 8 wherein the first and second event generators are selected from the group consisting of: a) an interactive voice response system, b) a financial transaction system, c) an account maintenance system, d) an application server, and e) a software application installed at a workstation.

10. The system of claim 8 wherein:
the instructions, when executed, further cause the event processing server to
 vi) create a first event record in an event database corresponding to the first event information, and
 vii) create a second event record in the event database corresponding to the second event information.

11. The system of claim 8 wherein:
the first event information comprises a first event notification received from the first event monitoring agent; and
the second event information comprises a second event notification received from the second event monitoring agent.

12. The system of claim 8 wherein:
the first event information comprises first event log information saved to a first event log by the first event monitoring agent; and
the second event information comprises second event log information saved to a second event log by the second event monitoring agent.

13. The system of claim 8 wherein:
the instructions, when executed, further cause the event processing server to
 vi) execute the security response by issuing an instruction to at least one of the first or second event monitoring agents to halt at least one of the first event or the second event.

14. The system of claim 13 wherein:
the instructions, when executed, further cause the event processing server to
 vii) further execute the security response by transmitting a notification to an individual associated with a security monitoring team.

* * * * *